Feb. 17, 1970     P. EISLER     3,495,327
METHOD OF MAKING ELECTRICAL COILS
Filed June 3, 1966     10 Sheets-Sheet 1
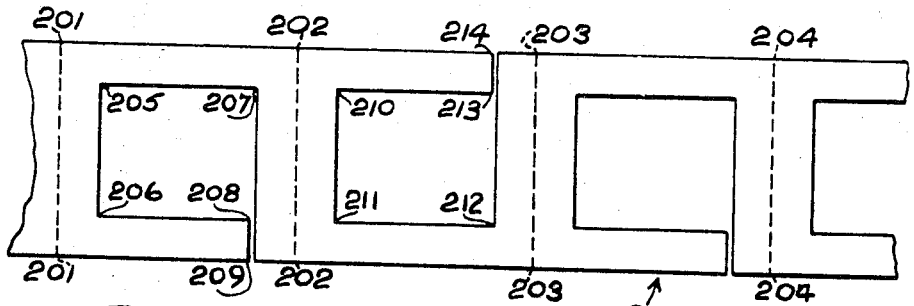
FIG.1.
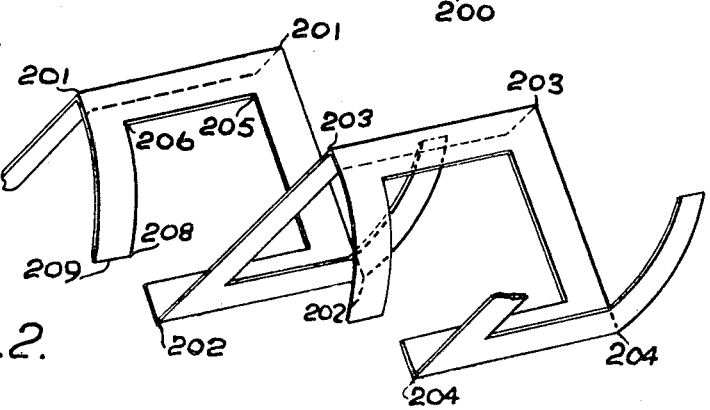
FIG.2.
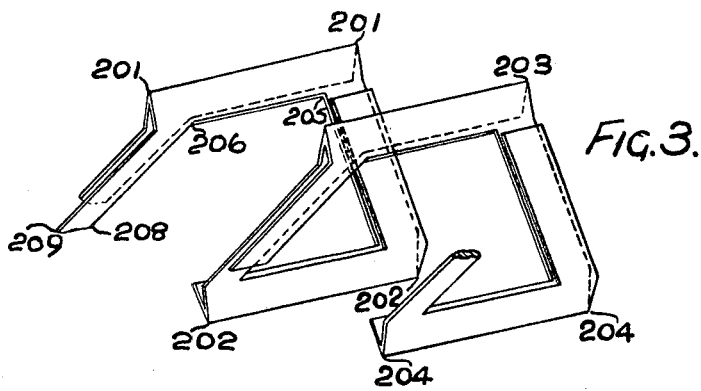
FIG.3.
FIG.4.
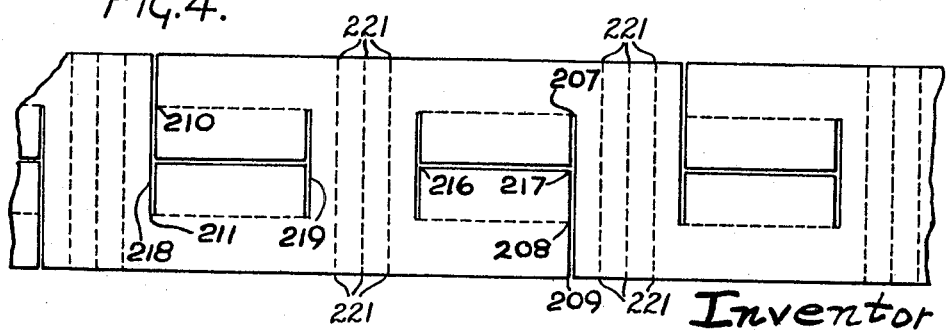
Inventor
Paul Eisler
By Watson, Cole, Grindle + ...
Attys.

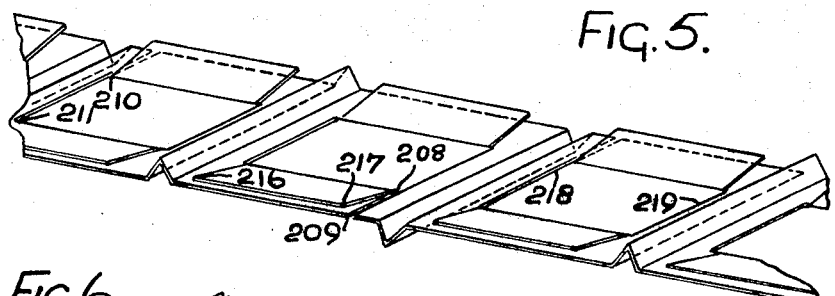
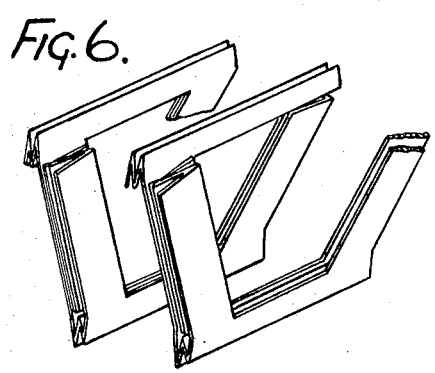
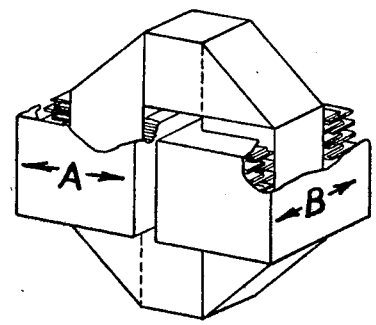
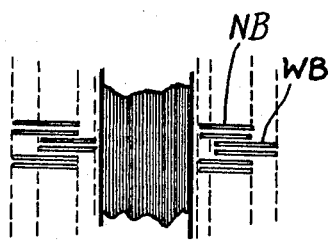
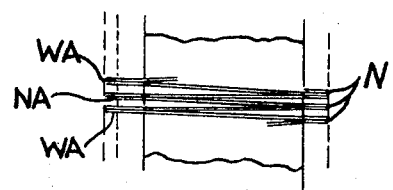
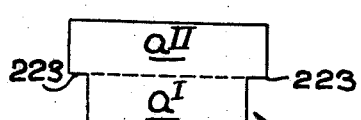
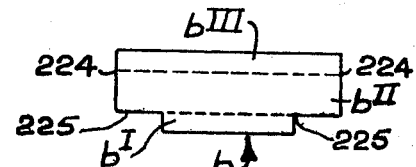

Feb. 17, 1970 P. EISLER 3,495,327
METHOD OF MAKING ELECTRICAL COILS
Filed June 3, 1966 10 Sheets-Sheet 3

Inventor
Paul Eisler
By
Watson, Cole, Grindle & Watson
Attys.

Feb. 17, 1970 P. EISLER 3,495,327
METHOD OF MAKING ELECTRICAL COILS
Filed June 3, 1966 10 Sheets-Sheet 4

Inventor
Paul Eisler
By
Watson Cole Grindle + Watson
Attys.

Feb. 17, 1970  P. EISLER  3,495,327
METHOD OF MAKING ELECTRICAL COILS
Filed June 3, 1966  10 Sheets-Sheet 5

Inventor
Paul Eisler
By Watson, Cole, Grindle + Watson
Attys.

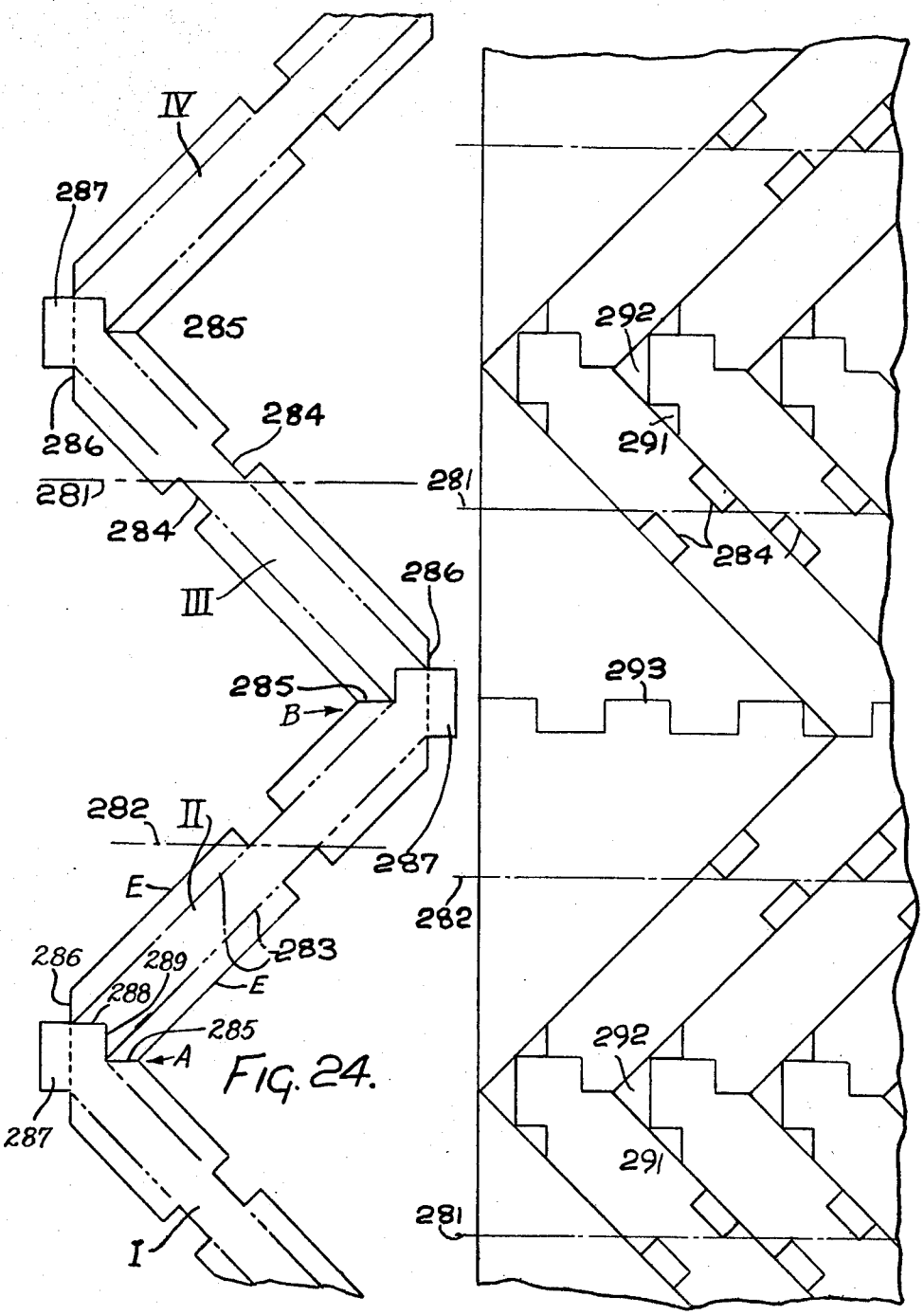

Feb. 17, 1970      P. EISLER      3,495,327
METHOD OF MAKING ELECTRICAL COILS
Filed June 3, 1966      10 Sheets-Sheet 9

Inventor
Paul Eisler
By Watson, Cole, Grindle & Watson
Attys.

United States Patent Office 3,495,327
Patented Feb. 17, 1970

3,495,327
METHOD OF MAKING ELECTRICAL COILS
Paul Eisler, 57 Exeter Road,
London NW. 2, England
Filed June 3, 1966, Ser. No. 555,096
Claims priority, application Great Britain, June 3, 1965,
23,641/65
Int. Cl. H01f 7/06
U.S. Cl. 29—609                    10 Claims

ABSTRACT OF THE DISCLOSURE

Helicoids to serve as electrical coils e.g. transformer windings are made from continuous metal foil by cutting and folding the turns being all of constant thickness throughout. A repeating looped pattern may be cut, longitudinal arms on alternate sides severed and bent back on to the next turn, and the pattern concertina folded into a helicoid. Or a zig-zag pattern may be cut which is concertina folded on lines part way along each limb the extra thickness at the folds being eliminated either by superposing two patterns with intermeshing complementary formations at the folded zones, or leaving the zones single thickness and folding the arms elsewhere into double thickness. The turns are insulated from one another.

---

Figure 8:
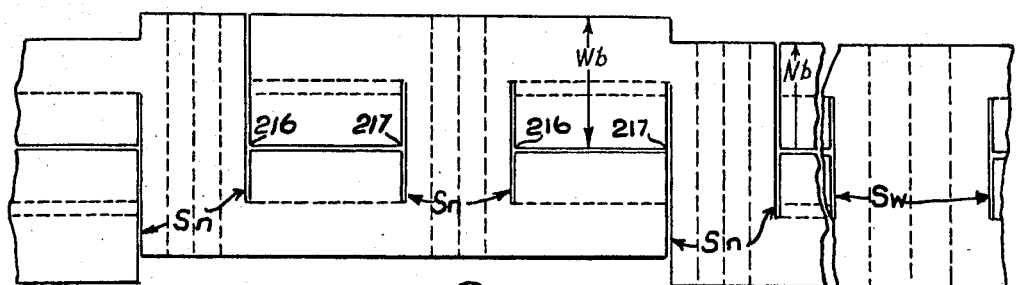
Figure 13:
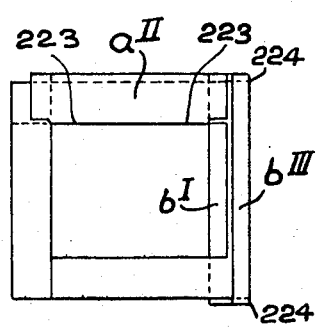

The present invention is concerned with the production of electrical coils from flat strip conductive materials of a helicoid configuration containing more than one turn and usually many turns. The helicoid is usually of rectangular form but not necessarily so and a major object of the invention is to produce a coil by folding or assembling the conducting material while yet maintaining a constant thickness throughout.

Unless the material is deformed in its own plane (which is impracticable with many thin materials) it is impossible to make a helicoid coil from strip material with the width of a material normal to the axis and the thickness of the material parallel to the axis without folding or superposing the material and such folding or assembling necessarily results in increased local thickness which the present invention in effect eliminates. The turns are not necessarily of single thickness but they are of substantially constant thickness so that a good space factor can be obtained.

Adjoining turns of the helicoid may be in line or be staggered and the centre of the coil is usually occupied by an iron core, as when the helicoid is used as a transformer winding. In another field of application heat may be developed in the spaced turns in analogy to coiled-coil filaments in incandescent lamps, the flat width of neighbouring turns of the strip radiating towards one another while the coil itself may form the secondary closed on itself of a transformer and be supported preferably indirectly on an iron core in its centre.

In the last example the heat produced in the coil strip is mainly dissipated from the strip over its width. In a multiturn transformer coil, on the other hand, the adjacent turns of which are pressed together or have no gaps, the heat dissipation is effected from the surface of the relatively thin strip edge. Staggering of the turns and other means described later enable this surface to be enlarged without loss to the good heat conduction through the strip conductor which extends over the whole width of the turn. Most transformer coils usually have a relatively appreciable axial length. The present invention will be described by way of example with reference to folded transformer coil production without implying any restriction to such types and uses of folded strip coils.

The thinning of the edges of the turns of the strip coil and of areas to be doubled by folding over, the thickening of arms where desired, the staggering of turns and the heat dissipation from the coils have been dealt with in my Patents Nos. 3,089,017 and 3,239,642. The present invention is concerned essentially with varieties of a novel method and means of production of folded or assembled coils from material which can be drawn from reels or rolls.

As applied to the production of helicoids from strip material by cutting the strip into a form from which the strip can be brought into turns about the axis of the helicoid, the invention correlates these operations to reduce the area of the material in the region of the folds in inverse ratio to the number of layers produced by folding. By virtue of this ratio of reduction and by suitably disposing the reduction the total thickness throughout the fold is substantially uniform and the same as elsewhere in the helicoid.

There are two main ways in which the removal of material can be effected. In one the material is removed entirely on one side of the fold. As will be shown, this does not involve any waste of material because the area to be removed is bent or folded to transfer it to the next turn. This method involves at least a double thickness of material throughout the helicoid. In the other two layers which are superposed have material removed by punching out or similar operations at areas which will be doubled over in concertina folding. This reduces the thickness to a single layer here so that when the fold is made the total thickness here is the same as elsewhere. There may be intermeshing patterns in both layers or the material may be removed from one alone.

Other objects and features of the invention will appear as the description proceeds.

The invention will be further described with reference to the accompanying diagrammatic drawings in which:

FIGURE 1 illustrates part of a length of material from which one embodiment of a helicoid in accordance with the invention can be made, FIGURE 2 illustrates a stage in the production of the winding from the material of FIGURE 1, FIGURE 3 illustrates a further stage beyond FIGURE 2, FIGURES 4, 5 and 6 are similar views to FIGURES 1, 2 and 3 relating to another, though similar embodiment of a helicoid in accordance with the invention, FIGURE 7 is a perspective diagram of a transformer incorporating windings with staggered edges, made from helicoids according to the invention, FIGURE 8 is a view similar to FIGURES 1 and 4 of the strip material from which the helicoids used in FIGURE 7 are made, FIGURE 9 is a diagram illustrating the staggering of the edges of the windings as seen in one direction, and FIGURE 10 a diagram illustrating the staggering of the edges of the windings as seen in a direction at right angles to FIGURE 9.

Figure 14:
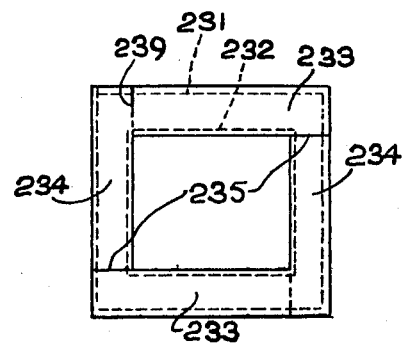
Figure 15:
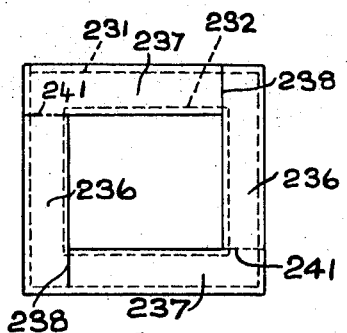
Figure 16:
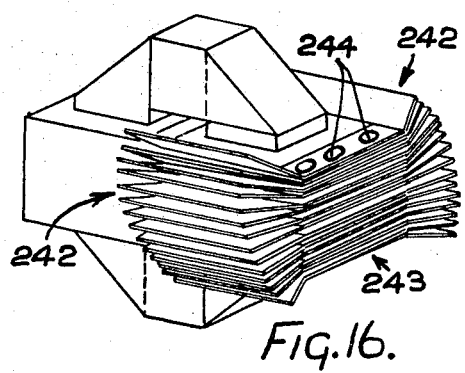
Figure 17:
Figures 18, 26:
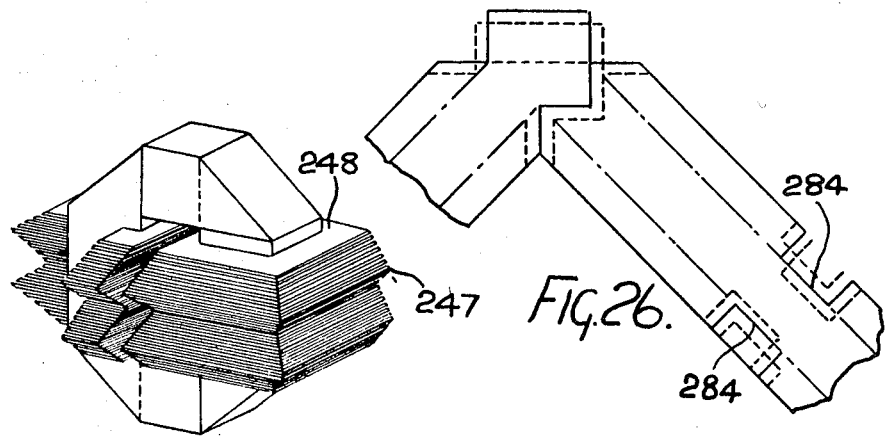
Figure 20:
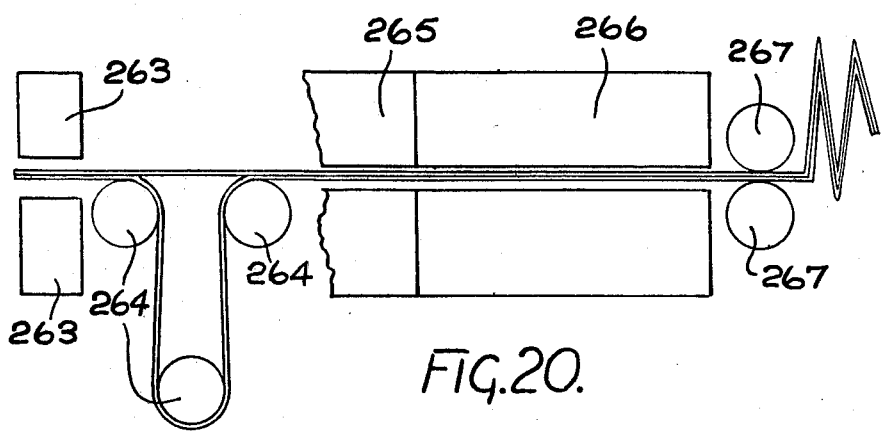
Figure 19:
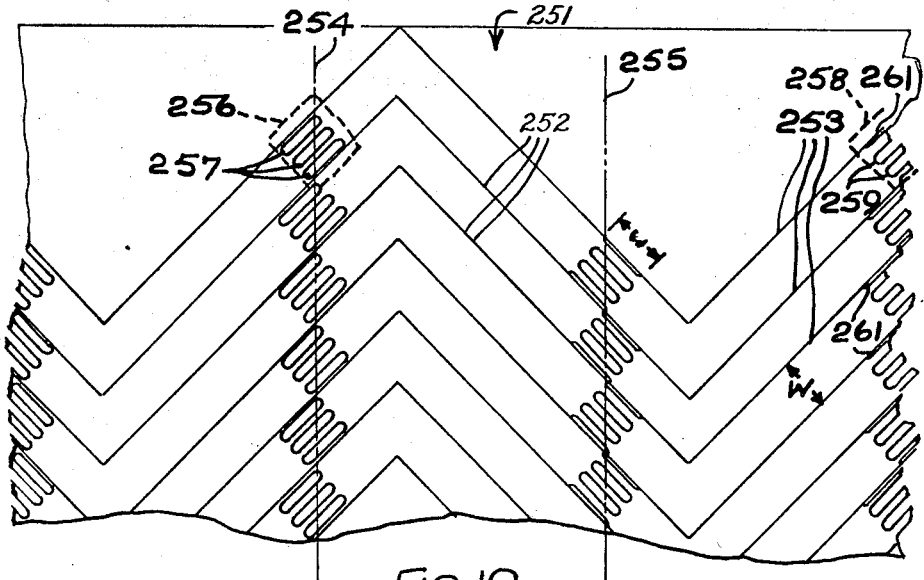
Figure 21:
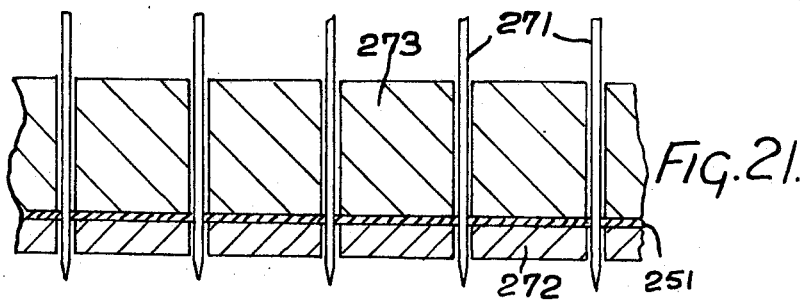
Figure 22:
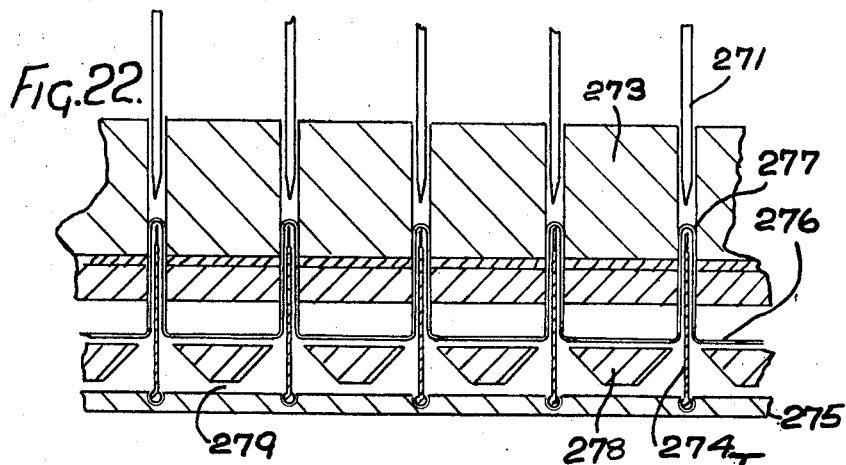
Figure 27:
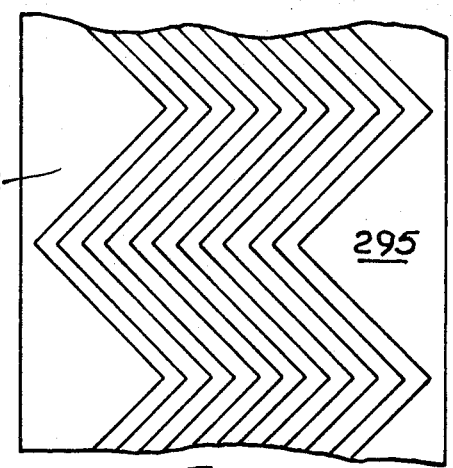
Figure 28:
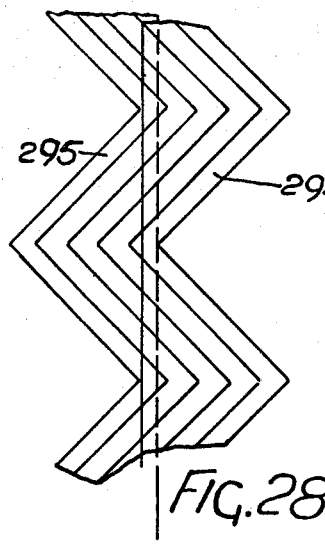
Figure 29:
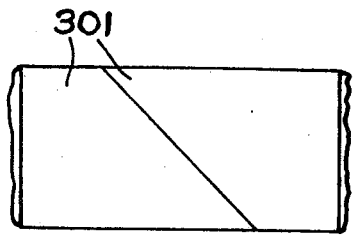
Figure 30:
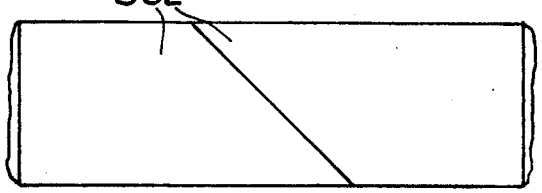
Figure 31:
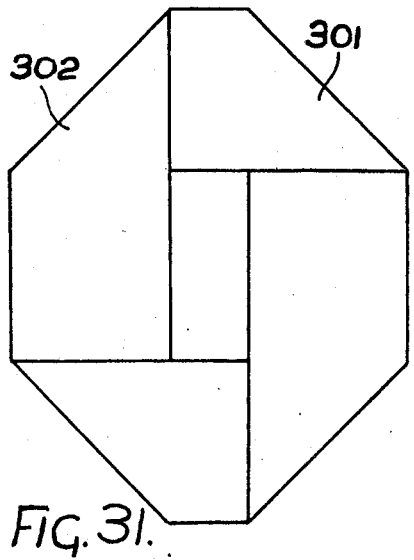
Figure 32:
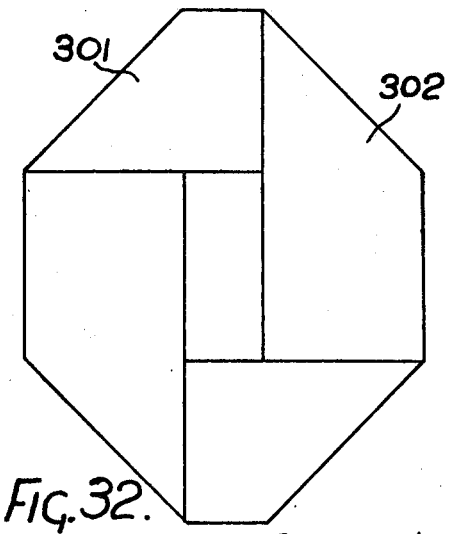
Figure 33:
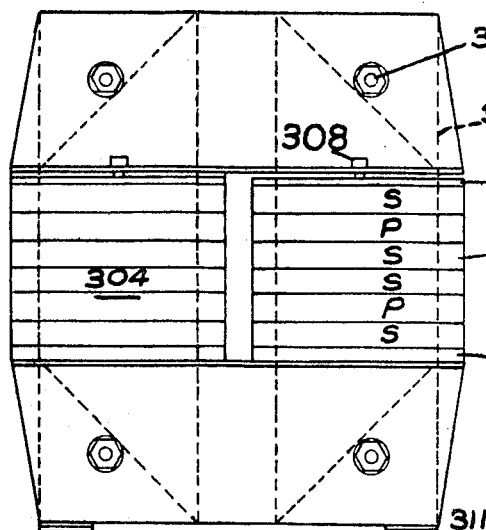
Figure 34:
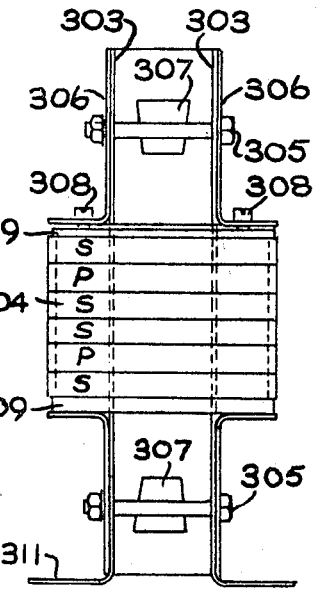
Figure 35:
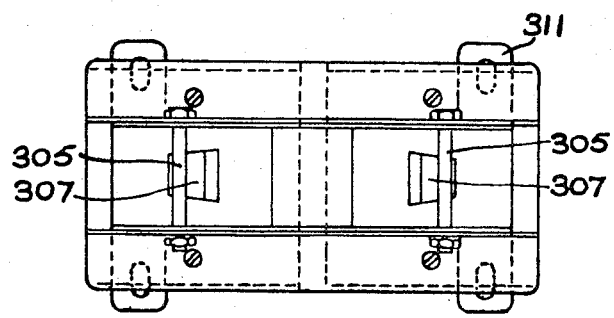
Figure 40:
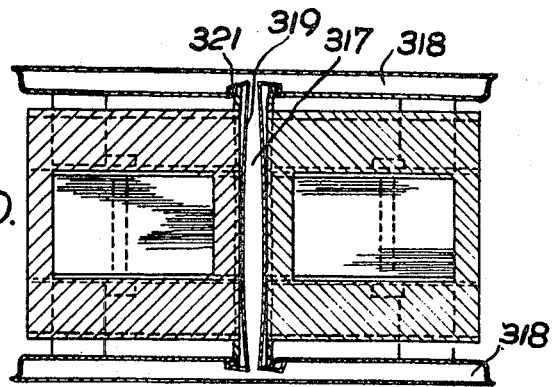
Figure 37:
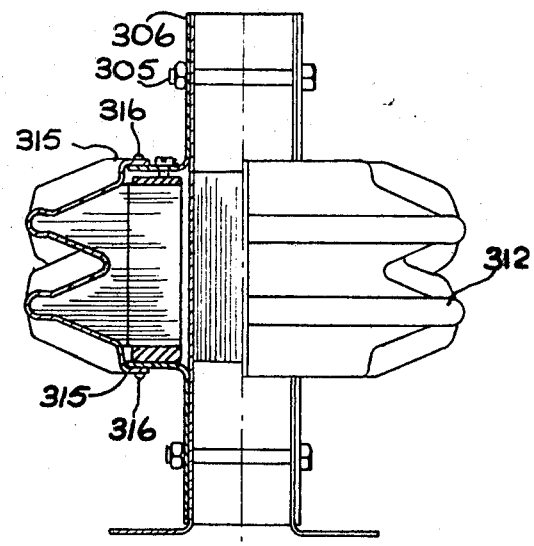
Figures 38, 39:
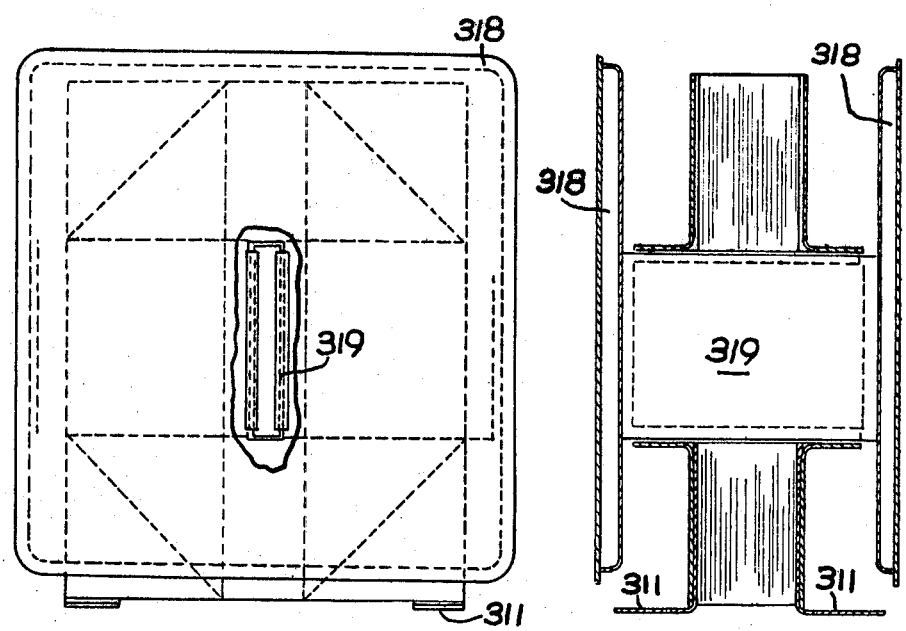
Figure 36:
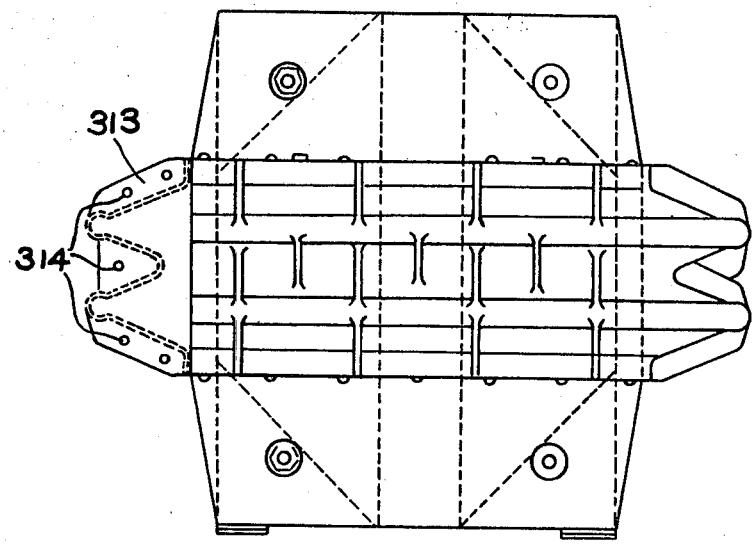
Figure 23:
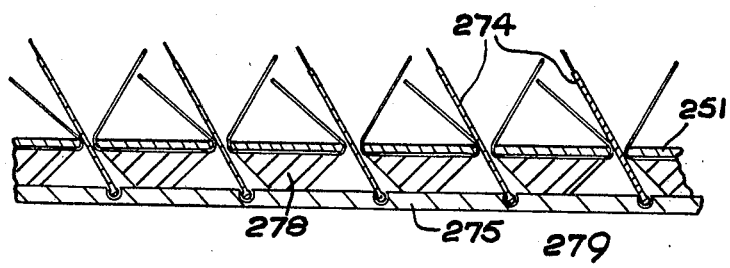

FIGURES 11 and 12 show the shapes of pieces of insulating or spacing material which can be used to insulate or space the turns of the helicoids of FIGURES 1 to 10, FIGURE 13 illustrates one half of one turn of a helicoid with the insulating or spacing material applied to it, FIGURES 14 and 15 are end views illustrating another way of insulating or spacing the turns of the helicoid with separate pieces of material, FIGURE 16 is a perspective view showing improved heat dissipation by the use of wider foil-covered material in the method of FIGURES 14 and 15, FIGURE 17 is a detail of means for holding the outer edges of the insulation of FIGURE 16 in position, FIGURE 18 is a perspective view of the transformer provided with a winding according to the invention having staggered edges, FIGURE 19 shows the patterning of a web used in the production of helicoids by the second method of the invention, that is by the provision of interfitting patterning at the folds, FIGURE 20 is a diagrammatic side view of apparatus which can be used in the production of the pattern of FIGURE 19 and the subsequent folding of the material to form the helicoids, FIGURE 21 is a section of part of the slitting tools used in FIGURE 20, FIGURE 22 is a similar view to FIGURE 21 showing the provision of means for enveloping the arms of the helicoid with insulation, FIGURE 23 is a similar view to FIGURE 22 showing a further stage in the enveloping of the arms of the helicoid with insulation, FIGURE 24 shows one part only of another pattern of strip which can be used for making a helicoid by folding in accordance with the second method of the invention, FIGURE 25 illustrates a web with a whole pattern of strips of the form shown in FIGURE 24, FIGURE 26 illustrates modifications in the pattern of FIGURE 24 whereby the turns of the helicoid can be relatively staggered, FIGURE 27 and FIGURE 28 illustrate how material otherwise wasted can be salvaged after the production of the patterns shown in FIGURES 19 and 25, FIGURES 29 and 30 illustrate the production of pieces for the core of a transformer, FIGURES 31 and 32 illustrate the assembly of successive core laminations from the pieces of FIGURES 29 and 30, FIGURE 33 is a side elevation, FIGURE 34 an end elevation and FIGURE 35 a plan of an example of a transformer embodying a core in accordance with FIGURES 29 to 32, FIGURE 36 is a side view with a small part cut away, and FIGURE 37 a view at right angles to FIGURE 36 half in section showing the provision of a transformer with a shroud, FIGURE 38 is an elevation partly broken away, FIGURE 39 an end view in section, and FIGURE 40 a plan view in section an arrangement for cooling the part of the windings within the window of a transformer of the construction shown in FIGURES 33 to 35.

In the example illustrated by FIGURES 1 to 3, a continuous web 200 of foil (suitably of copper or aluminium) using the term foil to indicate strip material of suitable thickness to permit folding and other manipulations necessary without any specific limits being implied, of width equal to one external dimension of a rectangular section helicoid has similar rectangular openings punched or otherwise cut in it at a spacing leaving twice the required width of one side of the helicoid, the size of the openings in the case of a transformer winding being such as comfortably to clear the cross-section of a transformer core and leave room for thin (minimum) insulation between the helicoid and the metal of the core. The corners of two such openings are respectively marked 205, 206, 207, 208 and 210, 211, 212, 213. A cut extends on opposite sides of alternate openings but at the corresponding ends, to the edge of the web, as at 208, 209 and 213, 214.

In effect the web is subjected to a regular repeating pattern of sets of cuts. The primary cuts of each set cut and separate the inner edges of two longitudinal sides or arms and two transverse sides or arms, the four arms forming a loop here of rectangular form, while the secondary cut of each set severs one of the longitudinal arms as at 208, 209 and 213, 214. These secondary cuts are on opposite sides alternately so that the repeat is constituted by two sets of cuts. Also the adjacent transverse arms of successive loops are integral.

The web is now folded concertina fashion, i.e. in alternate directions, on transverse lines such as 201—201, 202—202, 203—203, 204—204, which lie between adjacent integral arms left by the pattern of cuts, an early stage in such folding being shown in FIGURE 2. Due to the cuts 208, 209 and 213, 214, etc., one side or arm of each loop which is defined by making the folds, can be bent or folded away against the corresponding side of the adjacent loop and when the sides or arms are pressed together as shown in FIGURE 3 a continuous helicoid, is obtained which is everywhere of double thickness. At diagonally opposite corners the continuous material of two sides or arms of the loop at the corner has the end of the arm produced by a cut such as 208, 209 on the opposite side to the transverse arm left by such cut, but this will cause no difficulty nor is there any substantial break in the continuity of the double thickness. It will be understood that FIGURE 3 shows the turns pulled apart longitudinally of the helicoid. This may be necessary during production, but in use (and in storage), the helicoid will be closed longitudinally (apart from interturn insulation which will be described later).

This embodiment involves waste of the material punched out of the openings, and economy can be achieved by folding, as shown in FIGURES 4, 5 and 6. Here instead of punching out the openings 205–208, 210–214, the primary cuts comprise a longitudinal cut 216, 217 suitably central, and a transverse cut 218, 219 at each end, one of these transverse cuts continuing as the secondary cut 208, 209 but in the next opening the transverse secondary cut is at 210, 211; this alternating sequence continues. The sides 205, 207; 206, 208; 210, 213; 211, 212, and so on are now fold lines and the flaps formed by the cuts are folded over as indicated in FIGURE 5. When the superposition of the longitudinal arms is effected, as shown in FIGURE 6 each of these arms will consist of four thicknesses. The like provision is needed in the transverse arms, to maintain constant thickness throughout the helicoid and to this end, three folds are made in opposite directions between successive openings, on three transverse lines 221—221, these folds being spaced to define four equal widths of material. Analogously to the previous embodiment, the direction of folding at each successive loop is in opposite sequence. The result is an extra V fold between between successive openings and transverse arms of the turns having four thicknesses of material.

As shown in both embodiments the transverse arms are narrower than the longitudinal arms but they could be of the same or even greater width by suitable choice of the longitudinal spacing of the openings. Also the longitudinal cuts 216, 217 need not be central nor need the width of the web be such that the folded flaps exactly overlap the marginal material of the web.

The helicoids described above with reference to FIGURES 1 to 6 can be modified as will be described to provide staggered edges. From FIGURE 7 which is a perspective diagram of a transformer with two windings or groups of windings made from helicoids of the kind in question, it will be seen that there are two directions in which variations in width which give rise to staggering can be effected, namely the direction A parallel to the plane which can conveniently if inaccurately be described as the plane of the window in the core, and the direction B perpendicular to that plane. Variation within the window in the direction A is usually not feasible because the window is usually substantially filled by the two windings. If this staggering is to be effected on the sides of the helicoid which are transverse to the web from which the helicoid is made on the lines described above with reference to FIGURES 3 to 6, all that is necessary is that every fourth space between successive openings should be wide, while all the others are narrow, as indicated at Sw and Sn in FIGURE 8. Then as shown in FIGURE 9, all the sides N of the helicoid along one side of the winding (which is inside the window of the core) will be equal and narrow, while on the opposite side they will be alternately wide WA and narrow NA.

To effect staggering in the direction B, the width of the web reckoning from the line of the longitudinal cuts 216, 217 is made alternately wider Wb and narrower Nb, FIGURE 8, over each two successive pitches, this sequence being of opposite phase on the opposite sides of the web. This gives a helicoid in which opposite arms are alternately spaced closer to and away from the core. They are in opposite phase on opposite sides, the arms WB which spaced away from the core being a little wider than those NB which are close as indicated in FIGURE 10. The sides of the web are stepped, see FIGURE 8 but with a number of webs cut from a wider web there will be no waste between them.

Other variations are possible. Thus, if in the web shown in FIGURE 8 the flaps are all of the same width to give an opening which just fits the core with the necessary interposed insulation, the wider arms will have margins only half the thickness of the main part of the width. Again the A direction staggering could be produced on the longitudinal arms of the web, though then if only on one side of the winding, the web would be straight along one side and stepped along the other, involving same waste unless alternate webs were reversed transversely. The B direction staggering could be produced on the transverse arms, when there would be a wider space at every second space between successive openings. Also all these schemes could be produced with the double thickness turns of FIGURES 1 to 3 as well as with the quadruple thickness turns of FIGURES 4 to 6.

Strictly speaking in the variations described with reference to FIGURE 8 the full repeat consists not of two sets of cuts but of four, but the repeat still consists substantially of two sets of cuts; each two sets of cuts is the same, it is only that the longitudinal spacing between them or the lateral disposition differs a little at intervals.

Preferably windings with staggered edges are used in cases in which heat transfer from the windings is effected by liquid or vapour cooling.

The above description does not deal with the insulation or spacing of the turns of the helicoid from one another. If the turns are to be insulated or spaced by separate material applied after the helicoid has been formed by folding the conductive material, this is conveniently done by means of folded thin material of appropriate quality (e.g. porous) typically paper, one piece being used for each arm of each rectangular turn. Thus, for two opposite arms a piece $a$ of the shape shown in FIGURE 11 is folded along the line 223—223 and fitted over the two opposite arms of the turn as in FIGURE 13 with the fold $f$ on the inside of the opening. The shorter part $a^I$ of the piece $a$ just fits snugly in the opening of the helicoid while the longer part $a^{II}$ extends half way across the other two arms of the turn. The other two arms are covered with pieces $b$ of the shape shown in FIGURE 12. This has two fold lines 224—224 and 225—225. The distance between these is equal to the width of the arm to be covered while outside these lines the width is half the width of the arm to be covered. The shorter part $b^I$ of the length (outside the line 225—225) fits snugly in the openings of the helicoid and is folded over on to the same face as the longer part $a^{II}$ of the piece $a$, see FIGURE 13. The part $b^{II}$ between the lines 224—224 and 225—225 lies against the opposite face of the helicoid and this abuts the end of the shorter part $a^I$ of the piece $a$, while the part $b^{III}$ beyond the line 224—224 is folded over the first mentioned face and abuts the part $b^I$ beyond the line 225—225. It will be seen that each butt joint thus formed is covered by an uninterrupted surface of paper on the next turn. Desirably the total width of the piece $a$ and length of the longer parts $b^{II}$ $b^{III}$ of the piece $b$ are such that the paper extends beyond the bare edge of the helicoid. The width above referred to must allow for the thickness of the helicoid.

Other ways in which the turns of a helicoid of the kind shown in FIGURES 1 to 10 may be spaced or insulated with separate material is shown in FIGURES 14 to 17. Basically the insulation consists of L shaped pieces used in pairs, two pairs between each two adjacent turns. In FIGURES 14 and 15 the outline (or end view) of the helicoid is indicated by the dotted lines 231, 232. The insulation extends a little beyond these lines inwardly and outwardly of the outline of the helicoid. In FIGURE 14 the L comprises one limb 233 the length of which is equal to the full length of the arm which for reference will be called the longitudinal arm of the helicoid, and another limb 234 the length of which is equal to the full length of the arm which for reference will be called the transverse arm of the helicoid less twice the width of the longitudinal arm. When this pair of L shaped pieces is assembled butt joints are formed at 235. In FIGURE 15 the L comprises one limb 236 of the full length of the transverse arm and the other limb 237 of the length of the longitudinal arm less twice the width of the transverse arm and when the pair are assembled butt joints are formed at 238. When one pair is superposed on the other between the turns of the helicoid, the material of one pair covers the butt joints of the other.

Instead of a pair of L shaped pieces of insulation in each of the two layers, there may be four rectangular pieces. If these are of the form obtained by dividing the L forms of FIGURES 14 and 15 respectively on the chain lines 239, 241 when the layers are superposed each butt joint in one layer will be covered by uninterrupted material in the other.

Such L shaped or rectangular spacing or insulating pieces can be made substantially wider than the arms of the helicoid so that they project substantially beyond the arms of the helicoid. Then if the pieces are cut from metal strip laminated with insulating material e.g. paper, covered almost to the edges with metallic, suitably aluminium, foil, on the faces which come into contact with the helicoid itself, they serve to improve the dissipation of heat, as well as increasing the effective current carrying cross-section. The projecting parts on at least one side can be fanned out to increase the air space, and where this is not possible, holes may be provided to facilitate air circulation.

FIGURE 16 shows an example. Since one side of each winding or group of windings passes through a window in the core, provision of such foil-covered extensions is not feasible on one side, but they can be provided on the three other sides, though they need not all be of equal width. On two opposite sides they are shown fanned out at 242. Fanning on the intermediate side 243 could not be done without difficulty at the corners but the projecting parts on this side have a row of holes 244 aligned in the successive layers to form vertical air shafts.

To help maintain the spacing of the layers and strengthen them their outer edges may be reinforced with a narrow strip 245 (FIGURE 17) of adhesive tape rolled up at intervals as at 246 to form spacing bosses.

Another possibility of improving the heat dissipation is to use metal strip material such as foil laminated with insulation made in a series of different widths say eight, and assemble them in order first of increasing size up to the widest then decreasing size down to the narrowest, then again of increasing size and so on, thereby attaining a staggered formation. Such a formation on three sides for a transformer with a windowed core is shown in FIGURE 18 where the widest insulation is at 247 and the narrowest at 248.

The use of laminated metal strip and spacing or insulating material such as foil-covered insulating or spacing material, enables a separate continuous helicoid as in FIGURES 1 to 10 to be dispensed with altogether. The laminated material is made of the shapes above described with reference to FIGURES 14 and 15 and these are assembled into a helicoid so that each turn comprises two layers of foil, the butt joints in one layer always being covered by uninterrupted foil in the other layer. This can be applied to helicoids in which the whole is under endwise pressure, or where part of the width is not under pressure and some sides are fanned out as in FIGURE 16. With these arrangements the foil preferably reaches flush with the edge of the paper or the like at least on some edges (preferably two), and a plain paper or the like is introduced between turns. Thus the final helicoid has three papers or the like between successive turns and each turn consists of two foil layers. Additional foils and/or papers can be introduced to give more layers.

An example of the second method of producing multi-turn helicoids according to the invention by cutting and folding thin material which can be referred to as foil without any limitation being implied beyond the requirement that it should be foldable, is illustrated by FIGURES 19 and 20. Here a wide web, part of which is shown in FIGURE 19 marked 251 has a series of cuts or slits 252, 253 at 45°, to opposite hands alternately, to the length direction of the web, this being the direction across the drawing. The cuts 252, 253 are regularly spaced to leave zig-zag strips of a desired width $w$. The length of each cut 252 or 253 is the sum of the lengths (measured on the outside of the helicoid) of two adjacent sides of the helicoid including the area of the corner to be produced by folding. The material is folded concertina fashion on the transverse lines 254, 255 which alternate along the web and bear a similar relationship to the alternate corners or summits of the zig-zag pattern of cuts between which they are located, in other words the lines 254, 255 are transverse to the principal axis of the zig-zag, i.e. to a mid line extending longitudinally of the web 251.

At the folds, which lie on opposite sides of the principal axis of the zig-zag, a square zone of the material of length and width $w$ is folded on a diagonal and if no provision were made the thickness after folding would be doubled. To avoid this half the area of the material is removed in a pattern of punched (or similarly made) slots. There are two types of pattern, one complementary to the other. In the pattern in chain line square 256 traversed by the left-hand line 254, there are three slots 257 each of length $w$ and width $w/6$ with a space of $w/6$ between two of them and a space of $w/12$ between the two outer slots and the edges of the strip. In the other pattern in chain line square 258 traversed by the right-hand line 254 there are two slots 259 of length $w$ and width $w/6$ and two recesses or half slots 261 on each side of width $w/12$. All the spaces between the slots and half slots are equal to $w/6$. The two patterns alternate on successive lines 254 in a continuous sequence. A similar arrangement applies to the patterns traversed by the lines 255. The spaces of one pattern exactly match the slots in the other. Accordingly if two webs similarly patterned are relatively displaced longitudinally by one pitch $p$ and superposed, the patterns of slots can be intermeshed thus effectively reducing the overall thickness at these square areas to be folded to a single thickness while elsewhere there is a double thickness. When the concertina folding has been effected, there will be a double thickness throughout.

It will be understood that the pattern of slots need not consist of three slots in each area. Any number $n$ can be used of width $w/2n$ with a space between of $w/2n$, those in one pattern being relatively displaced laterally with respect to those in the complementary pattern by $w/2n$.

It will be seen that in each of the superposed patterns there is a repeating pattern of cuts which leave the continuous zig-zag and which cover four successive arms of the zig-zag. Further that the first and third zones such as 256, 258 lie at the same distance on one side of the principal axis and the other zones which lie on the lines such as 255 are also at the same distance from the principal axis but on the opposite side to the zones 256, 258. It will be seen also that in each of the two strips which are superposed the cut away areas in one of the repeating patterns is complementary to the corresponding cut away areas in the other patterns.

Two webs can be superposed and processed simultaneously in an apparatus in which the web travels in steps of one half a pitch $p$. Referring to FIGURE 20, at the first station punching tools 263 are provided which punch the four different forms and dispositions of slot pattern in the correct sequence. Between this station and the next one web passes over guide rollers 264 which cause it to lag one pitch $p$ behind the other. At the next station the 45° cuts to one hand are made by slitting tools 265 and at the following station the 45° cuts to the other hand by slitting tools 266. Thereafter the concertina folding is effected at the last station. The figure shows feed rollers at 267 by way of example. If these have resilient surfaces they will ensure the intermeshing of the patterns of slots. Details of the punching, slitting and folding tools are not shown as they can be constructions known in the art.

Since the web 251 contains a plurality of patterns side by side, a corresponding number of helicoids is produced, laterally intermeshed but not interlooped. Consequently they can be separated laterally, i.e. perpendicular to the plane of FIGURE 2 while the concertina folds are loose. After separation (and insulation if necessary) they can be compressed axially.

The helicoids can be insulated as above described with reference to FIGURES 11 to 16. Alternatively the turns can be enveloped with insulating (or spacing) material in combination with the slitting of the web, before concertina folding. One arrangement of apparatus for the purpose is illustrated by FIGURES 21 to 23.

As shown in FIGURE 21 the slitting is done by a row of knives 271 each of the length of one slit (i.e. the length of one cut 252 or 253 in FIGURE 19). The web 251 is held down against a die 272 by a pressure pad 273, both the die and pad being slotted to clear and locate the knives, which descend to make the cuts and then withdraw, still remaining partly within the slots in the pressure pad 273 as shown in FIGURE 22. The pressure pad and die grip the web and thus maintain the slits aligned with the slots. A corresponding row of lower knives 274 is carried by a knife bar 275. Starting from a lower position than that shown in FIGURE 22, a strip 276 of paper or other appropriate foldable material (of the same width as the length of the slits) preformed with double folds 277 at the spacing of the knives is placed over the knives 274, if desired by automatic feed means, and the bar 275 is lifted to carry the knives 274 and paper 276, up wards and at the same time a lower pressure pad 278 slotted to clear the knives is also carried upwards. The combined thickness of the knives 274 and folds 277 is sufficiently less than the width of the slots in the die to ensure easy entry and if desired this may be facilitated by bevelling the lower edges of the slots in the die. The bar 275 and pad 278 are lifted far enough for the folds 277 to be carried through the slots in the die, the slits in the web and into the slots in the pad and for the pad 278 to press the strip 276 against the underface of the die 272, this ensuring constant alignment. Thereafter the bar 275 and knives 274 are lifted a little further (the clearance between the bar 275 and pad 278 shown at 279 in FIGURE 22 permitting this), when the knives 274 cut the summits of the folds 277. FIGURE 22 shows the parts after the folds 277 have passed through the slits in the web but before the lifting operations are complete. The knives 271 are retracted sufficiently not to interfere with these operations.

When this stage has been completed and there is no possibility of the folds 277 getting out of alignment, the knives 271 and pad are lifted or withdrawn quite clear, the die 272 is withdrawn (this is made possible by carrying the slots right through to one end so that the die is of comb form and withdrawing the die in a direction perpendicular to the plane of the drawing) and the pad 278 and bar 275 lifted to the position shown in FIGURE 23. The knives 274 are held to the bar 275 in such a way that they can rock relatively to it at their lower edges. By reciprocating the bar 275 as indicated by the double-headed arrow 279, the rocking of the knives 274 so produced folds the widths of paper or the like previously forming the sides of the folds 277 partially over the web 251 between the slits and one over the other. The knives 274 are then withdrawn by the bar 275 and the folding can then be completed, for example by the pad 273 or by some separate pressure member or even by the rollers 267 of FIGURE 20.

FIGURE 24 illustrates a single strip of another zigzag pattern which is folded into a helicoid and has the same thickness at the folded corners as elsewhere. In this example the folding lines are at 281, 282. Prior to concertina folding into the helicoid, the margins of the material are folded over back on to the rest of the strip, on the chain lines 283. These margins are just half the width of the portion between the lines 283 (which is the ultimate width of the arms or sides of the helicoid) so that when the margins have been folded over the edge abut along the centre line of the arm or side which is of double thickness. At the square areas traversed by the lines 281, 282 where the folding would double the thickness, notches 284 are made in the margins, of a length equal to the side of the square area, i.e. equal to the width between the lines 283. Thus when the margins have been folded over, there is only a single thickness at these square areas, which is doubled by the concertina folding.

At the zones at the corners of the zigzag, the margins which are on the inside of the zigzag are separated by cuts 285 perpendicular to the length of the web in which a pattern of strips of the form of FIGURE 24 is produced. Such pattern is shown in FIGURE 25 further described later. On the outside of the zigzag the material is cut and notched so that the margins terminate in edges 286 in the length direction of the web, and a flap 287 is left of length and width such that after the margins have been folded over, this flap can be folded over on to the rest of the strip and then just fills the space between the edges of the folded margins, thus giving a double thickness in this region and a similar form of corner to that formed by the concertina folding on the lines 281, 282.

FIGURE 24 also illustrates one way in which the helicoid can be insulated by the aid of insulating material secured to the strip before it is cut to shape. Alternate limbs of the zigzag are covered or coated with insulation on opposite faces. Assuming that the second and fourth limbs marked II and IV bottom are covered on the upper face as seen in the drawing and the other limbs I and III in the underface, the precise boundaries of the insulation on the left-hand face i.e. on limbs II and IV is along the edges E of the strip, at the end A at the edge 285, 286 the edges 288, 289 (which bound part of the area onto which the flap 287 is folded) and B at the right-hand end over the whole area of the flap 287 and over the area corresponding to that on to which the flap 287 is folded. On the underside, the other limbs are correspondingly covered, but reversed left and right so that at the corners of the zigzag the metal strip is only covered with insulation on one surface. Folding of the margins is done downwards in the second and fourth limbs and upwards in the other two; the flaps are correspondingly folded. Thus all the doubled zones are metal to metal and the whole zigzag is externally covered with insulation.

FIGURE 25 shows a wide web with a multiplicity of strips as in FIGURE 24 formed in it, the material cut away being the recesses 284 and triangular slots 291, 292. If insulation is to be effected as described with reference to FIGURE 24, the web is covered on alternate sides with insulation, each band of insulation having boundaries as indicated by the line 293.

The patterns above described with reference to FIGURES 19 and 24 results in helicoids having turns all of the same form directly superposed. Variations in width giving staggered edges (akin to the staggering above described with reference to FIGURES 9 and 10). can be achieved by varying the pattern on the lines described with reference to FIGURE 8 for which purpose the tools which do the punching and cutting may be adjustable in length and position, and if the pattern is suitably laid out there need be no additional waste of material. For example the length of the limbs of the zigzag may be varied and the position of the notches 284 be varied. Thus FIGURE 26 shows a small part of the same pattern as FIGURE 24 in the solid lines, with alternative outlines in broken lines in the region of the notches 284, and the corners of the zigzag. The two alternatives at each position may be used alternately to produce staggered corners in the helicoid.

The patterns of FIGURE 25 (and the modifications of it) result after concertina folding, in helicoids laterally related and intermeshed as described with reference to FIGURE 19 and can similarly be separated while the concertina is loosely folded. These patterns can moreover be processed by apparatus on the lines described with reference to FIGURE 20 and could be insulated or spaced in combination with slitting as described with reference to FIGURES 21 to 23 provided the preformed insulation was notched to correspond with the notches 284 and to give suitable clearance at the corners of the zigzag. These methods of processing the strip material involve movements of the tools and materials in three dimensions and the processing can be regarded as a three dimensional operation.

The patterns shown in FIGURES 19 and 25 involve unavoidable waste of the material of the slots such as 257 and 259 in FIGURE 19 and the notches 284 and slots 291, 292 in FIGURE 25. Further if the summits of the first and last zigzags lie in the edges of the web a row of triangular areas will be wasted along each side of the web. By using a web a little wider as in FIGURE 27 continuous pieces 294, 295 will be left along each side. These can have the continuous zones overlapped as in FIGURE 28, these overlapped zones being seam welded together, for example ultrasonically and the seam reduced in thickness. This results in a fresh web having sides shaped so that it can be patterned without loss beyond the slots or the notches and slots and the slight loss of reducing the thickness of the seam.

It will be clear all the helicoids produced by the methods above described can be produced in lengths only limited by the supply of material. They can be stored in such lengths, and shorter pieces cut off as needed.

Further, although strictly rectangular forms have been above described, the invention is not so limited. The helicoids can readily be produced with rounded corners and this can be carried to the point at which the form approximates to a circle, an ellipse or an oval, including forms with two parallel sides joined by curves. Such forms usually involve additional unavoidable waste of material however. Nevertheless the terms transverse and longitudinal and the term zigzag used herein are to be interpreted accordingly.

The invention also extends to transformers in which windings in the form of helicoids made as above described can be used with advantage.

FIGURES 29 to 35 diagrammatically illustrate the production and assembly of transformers having cores with corners cut off at 45° and can be produced without waste from plain strip material. Each lamination comprises four pieces each with parallel sides, one end at right angles to the sides and the other at 45°. In general an oblong window is needed and two of the pieces are longer than the other but all are of equal width.

The pieces are cut from a plain strip, suitably of grain oriented silicon steel, by cropping across the grain. The cropping tool has two settings and one setting at each cycle produces two pieces 301 of the same shape and the smaller size end to end as indicated in FIGURE 29. At the other setting it similarly produces two pieces 302 of the same shape and of the larger size, FIGURE 30. The pieces for alternate laminations are assembled with butt joints as indicated in FIGURES 31 and 32 respectively so that when the laminations are assembled into a core the joints in one lamination are covered by uninterrupted material in the adjacent laminations.

The edges produced by croppings are deburred and preferably swaged (thinned) before assembly. If electrical sheet steel strip with insulation on one side is used, half the pieces should be cropped with the insulation on top and the other half with the insulation at the bottom. Then if pieces from one half are assembled as in FIGURE 31 and those from the other half as in FIGURE 32 all the laminations will have the insulation on the same face.

In building the transformer, see FIGURES 33 to 35 the longer sides of the core together with a rectangular end plate or cheek 303 of greater thickness than the laminations at each face of each stack are assembled with the windings indicated generally by the numeral 304 encircling two sides of the core and the remainder of the core pieces are also assembled. The core is clamped by bolts 305 passing through angle plates 306, the bolts 305 clearing the inclined corner surfaces of the core by a sufficient distance to admit wedges 307, the driving up of which will tighten up the butt joints between the edges of the core pieces. Axial pressure on the windings is produced by screws 308 in the limbs of one pair of angle plates 306, packing strips 309 serving to spread and transmit the pressure at both ends of the windings. Feet by which the transformer can be bolted down may be formed by bent over lugs 311 integral with the cheeks 303 or they could be formed integrally with the angle plates 306.

Desirably the windings are sectionalized into two primary sections P and four secondary sections S assembled as shown.

This construction can obviously be used with the extended foil covered insulation as in FIGURES 16 and 18. In the latter case a suitably shaped shroud made in two parts, 312, FIGURES 36 and 37, joining on flanges 313 secured together by screws 314 and having flanges 315 secured by screws 316 to the angle plates 306, may be used to protect and support the projecting insulation.

This construction of transformer can also be used immersed in a liquid.

With the construction shown in FIGURES 33 to 35 the zone at which the dissipation of heat is most difficult is between the windings within the windows. This may be dealt with by a central shallow metal box in contact with the faces of the windings within the window, the ends of the central box connecting with the material of two larger shallow metallic containers set perpendicular to the central box, these containers being clear of the windings and suitably as seen in elevation of substantially the same area as the whole transformer.

FIGURES 38 to 40 show the central box 317 opening at its ends into the containers 318, the box and containers being of thin sheet material, so that they can readily be produced and sealed on can-making machinery. The enclosed volume is filled with water or other transformer coolant. Leaf springs 319 with bent over ends 321 to engage the joints between the box and containers press the flat sides of the box against the surfaces of the windings within the window, the flexibility of the thin walls of the box permitting good contact to be made. A good natural circulation of coolant is set up and the heat extrated from the zone within the core is transmitted to and dissipated through the larger surface of the two containers 318.

Instead of using leaf springs 319 to press the sides of the container against the surface of the windings, the sides could be secured to the surfaces by a cement able to resist the temperature, without impeding the heat flow.

The building up of interturn insulation in pieces as described with reference to FIGURES 11 to 13 or FIGURES 14 to 15 enables different insulating material to be used in different parts or sides of the winding. In particular, it enables insulation of better heat resistance, such as mica, to be used in the sides of the windings which lie within the window where heat dissipation is most difficult and where the temperature may therefore be higher than might be desirable with insulation of say paper.

What I claim is:

1. A method of producing a helicoid from a continuous metal foil strip which includes the steps of making a repeating pattern of cuts through the strip, each repeat including two sets of cuts, each set of cuts comprising primary cuts serving to separate inner edges of two substantially longitudinal arms and of two substantially transverse arms, said arms forming a loop, all the adjacent transverse arms left by the sets of cuts being integral, each set of cuts further including a secondary cut severing one of the longitudinally arms, the two secondary cuts of a repeat being on opposite sides, folding the patterned strip concertina fashion at least on transverse lines lying between adjacent integral transverse arms left by the pattern of cuts, bending back each longitudinal arm severed by the secondary cuts against the corresponding unsevered arm of the next loop, thereby bringing the patterned strip into the form of a helicoid with two layers of foil throughout, and disposing electrical insulation between the turns of the helicoid.

2. A method according to claim 1 in which the primary cuts of each set of cuts consist of two longitudinal cuts and two transverse cuts which leave a window in the strip, and the secondary cuts are located at the junction of a longitudinal arm with a transverse arm.

3. A method according to claim 1 in which the primary cuts of each set consist of a longitudinally substantially central slit and two transverse slits at the ends of the longitudinal slit, the method further including folding the flaps defined by the slits back on to the continuous material along the margins of the strip thus increasing the number of layers of material in the longitudinal arms of the helicoid, and making a corresponding number of extra folds on transverse lines lying in the transverse arms thus correspondingly increasing the number of layers of material in the transverse arms of the helicoid.

4. A method according to claim 1 which includes insulating each turn of the helicoid by folding sheet insulation round separate parts of the turn, each piece of sheet insulating being shaped to abut the next piece and to present a continuous surface over the butt joints in the insulation on the next turn.

5. A method according to claim 1 which includes insulating each turn by juxtaposing L-shaped pieces of insulation between adjacent turns of the helicoid, the pieces being shaped to abut with the butt joints between each pair of the pieces overlapped by continuous material of the other pair.

6. A method according to claim 1 in which the step of insulating adjacent turns is effected by the insertion of sheet insulating material covered with metal disposed so that the insulating material insulates the metallic layer from the turns of the helicoid.

7. A method of producing a helicoid from a continuous metal foil strip which includes making two repeating patterns of cuts through the strip, each repeat including cuts inclined to the length of the strip to leave a continuous zig-zag strip, each repeat including four successive limbs of the zig-zag, the pattern of cuts further cutting away, in each repeat, part of the area of the strip extending over four zones, one in each limb and of a length at least equal to the width of the limb, the first and third of said zones being located at the same distance from and to one side of the principal axis of the zig-zag, the second and fourth of said zones being located at the same distance from one and to the other side of the principal axis of the zig-zag, the cut away areas in one of the repeating patterns being complementary to the corresponding cut away areas in the other pattern, superposing the two zig-zag strips with the zones of complementary cut away areas superposed, intermeshing the complementary zones to reduce the overall thickness at the zones to that of one layer of the strip, folding the superposed strips concertina fashion on lines which are transverse to the principal longitudinal axes of the zig-zags and intersect the intermeshed zones diagonally, thereby bringing the superposed strips into the form of a helicoid with two layers of foil throughout, and disposing electrical insulation between the turns of the helicoid.

8. A method according to claim 7 in which both repeating patterns are identical and the cuts in mid zones of the first and third arms leave complementary areas and the cuts in said zones of the second and fourth arms leaving complementary areas, and the two strips are superposed at a longitudinal displacement equal to half the repeat length whereby the complementary areas become superposed throughout.

9. A method of producing a helicoid from a continuous metal foil strip which includes making a regular repeating pattern of cuts through the strip, each repeat including cuts inclined to the length of the strip to leave a continuous zig-zag strip, each repeat comprising two successive arms of the zig-zag, the cuts further cutting away half the width of the strip in each repeat at two zones each of a length equal to substantially half the width of the strip so that at each zone a square area is left, the two zones being located on opposite sides of the principal longitudinal axis of the zig-zag, folding over the material of the strip to double its thickness everywhere except at said zones, folding the strip concertina fashion on lines which are transverse to the principal longitudinal axis and intersect said zones diagonally, thereby bringing the strip into the form of a helicoid with two layers of foil throughout, and disposing electrical insulation between the turns of the helicoid.

10. A method according to claim 9 in which the electrical insulation is disposed on the foil strips before the material is folded, to lie on opposite sides of the foil strip on alternate limbs of the zig-zag, the insulation at one end of each limb leaving said square area bare on one side and covering it on the other side, and in which the folding over of the material to double its thickness is effected in a direction to bring the insulation on the outside surface of the doubled material.

References Cited

UNITED STATES PATENTS

| | | | |
|---|---|---|---|
| 783,546 | 2/1905 | Rupley | 29—605 |
| 1,365,568 | 1/1921 | Troy | 29—609 X |
| 2,014,524 | 9/1935 | Franz. | |
| 2,378,884 | 6/1945 | Seifert | 29—602 X |
| 2,851,765 | 9/1958 | Hanlet | 29—602 |
| 2,961,747 | 11/1960 | Lyman | 336—223 X |

JOHN F. CAMPBELL, Primary Examiner

CARL E. HALL, Assistant Examiner

U.S. Cl. X.R.

59—91; 336—206, 223